US009332158B2

(12) United States Patent
Mori et al.

(10) Patent No.: US 9,332,158 B2
(45) Date of Patent: May 3, 2016

(54) COLOR PROCESSING APPARATUS, IMAGE FORMING APPARATUS, AND NON-TRANSITORY COMPUTER READABLE RECORDING MEDIUM PERFORMING COLOR CONVERSION, ADJUSTMENT AND MATCHING PROCESS BETWEEN INPUT COLOR DATA AND REPRODUCIBLE COLOR DATA OF IMAGE OUTPUT DEVICE

(71) Applicant: FUJI XEROX CO., LTD., Tokyo (JP)

(72) Inventors: Kenji Mori, Kanagawa (JP); Shinsuke Sugi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/470,126

(22) Filed: Aug. 27, 2014

(65) Prior Publication Data
US 2015/0237235 A1  Aug. 20, 2015

(30) Foreign Application Priority Data

Feb. 20, 2014 (JP) .................................. 2014-030797

(51) Int. Cl.
G06K 1/00 (2006.01)
H04N 1/60 (2006.01)
(52) U.S. Cl.
CPC .................................. H04N 1/6033 (2013.01)
(58) Field of Classification Search
None
See application file for complete search history.

(56) References Cited

U.S. PATENT DOCUMENTS

| 5,956,015 | A | * | 9/1999 | Hino | .............................. 345/600 |
| 8,072,659 | B2 | * | 12/2011 | Yamauchi | ............ H04N 1/6058 358/1.9 |
| 8,861,037 | B2 | * | 10/2014 | Ukishima | ..................... 358/3.23 |
| 2013/0100468 | A1 | * | 4/2013 | Hoshino | ........................ 358/1.9 |
| 2014/0185114 | A1 | * | 7/2014 | Takemura | ..................... 358/504 |

FOREIGN PATENT DOCUMENTS

| JP | 2006-165864 | * | 6/2006 |
| JP | A-2006-165864 | | 6/2006 |

* cited by examiner

Primary Examiner — Steven Kau
(74) Attorney, Agent, or Firm — Oliff PLC

(57) ABSTRACT

Provided is a color processing apparatus including an associated information obtaining section that obtains first associated information in which first color information in a first color space is associated with first output color information that is a target to be output in a second color space, and second associated information in which the first color information is associated with second output color information in the second color space of an image output, an output section that outputs second color information in the first color space to the color adjustment target unit, an output color information obtaining section that obtains third output color information in the second color space output by the color adjustment target unit, and a conversion relation creating section that creates the conversion relation.

15 Claims, 8 Drawing Sheets

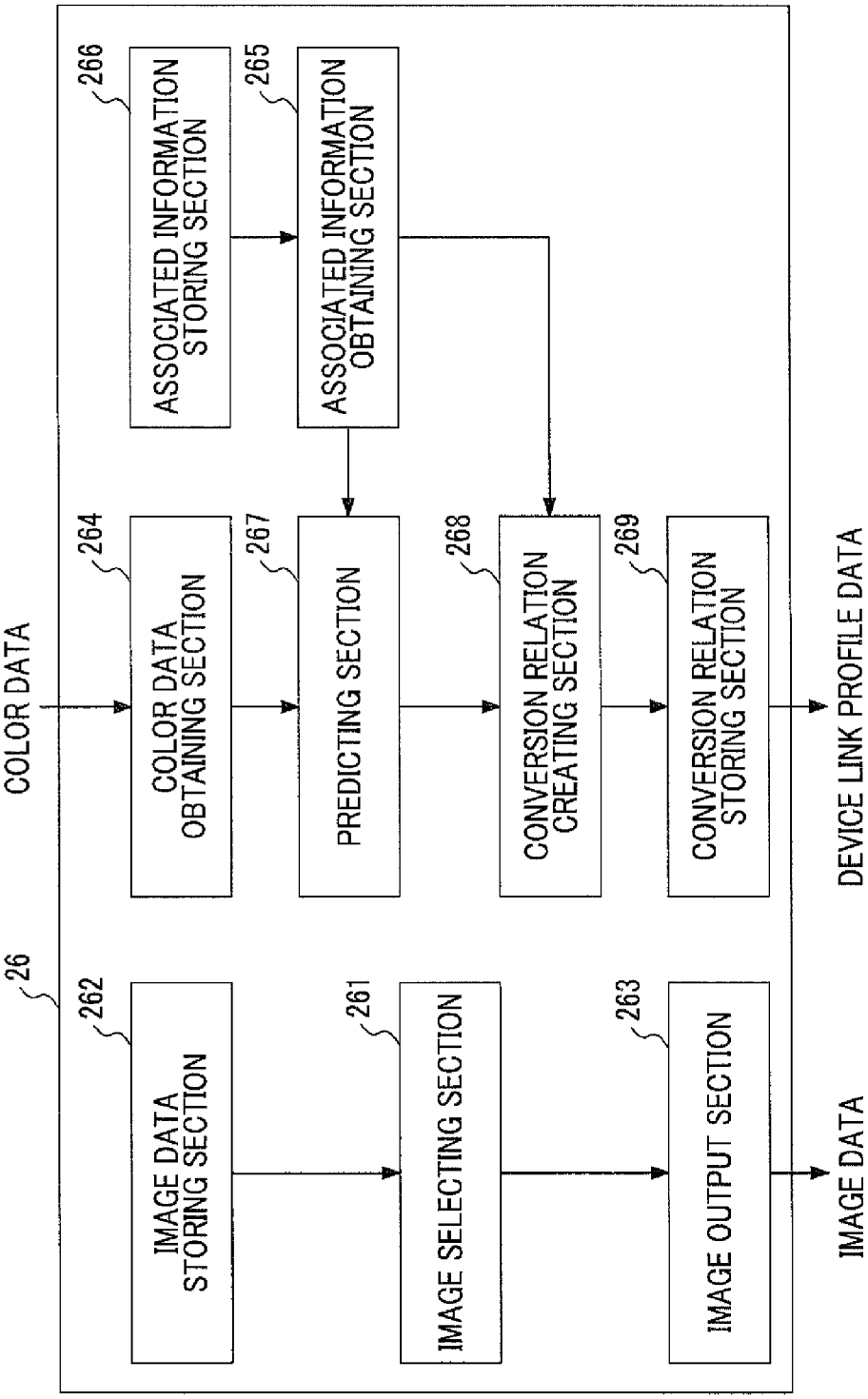

FIG. 4A

TARGET INFORMATION

| C | M | Y | K | L* | a* | b* |
|---|---|---|---|-----|------|------|
| 70 | 100 | 100 | 100 | 12.1 | 2.3 | 6.7 |
| 25 | 0 | 0 | 0 | 82.0 | -6.8 | -12.5 |
| 70 | 0 | 0 | 20 | 54.6 | -35.5 | 43.0 |
| 40 | 100 | 100 | 0 | 36.9 | 49.4 | -1.3 |
| 40 | 0 | 40 | 0 | 12.2 | 9.2 | 0.6 |
| 40 | 100 | 0 | 100 | 17.6 | 23.7 | -8.4 |
| 40 | 0 | 70 | 80 | 52.3 | -10.1 | 28.6 |
| 20 | 0 | 0 | 60 | 65.1 | 0.4 | -1.8 |
| 0 | 100 | 70 | 50 | 23.2 | -2.0 | -13.6 |
| 0 | 0 | 100 | 0 | 21.8 | 27.7 | 17.3 |
| 100 | 0 | 0 | 80 | 68.7 | 6.8 | -15.8 |
| 30 | 100 | 0 | 0 | 39.3 | -44.9 | 14.6 |
| 100 | 40 | 100 | 0 | 48.6 | 11.7 | -28.0 |
| 60 | 0 | 60 | 100 | 17.6 | -6.0 | 7.9 |
| 40 | 0 | 70 | 0 | 66.6 | -17.9 | 9.7 |
| ... | ... | ... | ... | ... | ... | ... |
| 12 | 0 | 12 | 0 | 85.5 | -4.7 | 2.6 |
| 90 | 60 | 60 | 0 | 37.5 | -16.7 | -7.6 |
| 45 | 90 | 90 | 0 | 39.4 | 35.0 | 21.7 |
| 20 | 100 | 100 | 20 | 36.4 | 48.7 | 28.2 |
| 0 | 100 | 20 | 0 | 46.3 | 70.1 | 3.7 |
| 70 | 20 | 10 | 20 | 53.2 | -15.4 | -22.2 |
| 20 | 12 | 12 | 10 | 73.8 | -1.4 | -2.5 |
| 90 | 45 | 0 | 0 | 45.6 | -12.0 | -39.9 |
| 0 | 7 | 0 | 0 | 88.6 | 4.3 | -1.1 |

FIG. 4B

BASE DATA

| C | M | Y | K | L* | a* | b* |
|---|---|---|---|-----|------|------|
| 70 | 100 | 100 | 100 | 16.7 | 4.0 | 1.2 |
| 25 | 0 | 0 | 0 | 82.7 | -9.6 | -15.5 |
| 70 | 0 | 0 | 20 | 49.5 | -39.6 | 43.9 |
| 40 | 100 | 100 | 0 | 34.0 | 52.4 | -4.8 |
| 40 | 0 | 40 | 0 | 8.3 | 11.6 | -4.9 |
| 40 | 100 | 0 | 100 | 12.4 | 18.3 | -9.2 |
| 40 | 0 | 70 | 80 | 41.1 | -10.0 | 26.8 |
| 20 | 0 | 0 | 60 | 50.8 | -0.7 | -3.2 |
| 0 | 100 | 70 | 50 | 21.3 | -0.2 | -15.2 |
| 0 | 0 | 100 | 0 | 18.1 | 18.0 | 9.3 |
| 100 | 0 | 0 | 80 | 68.3 | 8.2 | -23.1 |
| 30 | 100 | 0 | 0 | 33.6 | -54.1 | 18.7 |
| 100 | 40 | 100 | 0 | 46.4 | 14.7 | -37.3 |
| 60 | 0 | 60 | 100 | 11.2 | -5.4 | 2.4 |
| 40 | 0 | 70 | 0 | 63.4 | -20.3 | 8.2 |
| ... | ... | ... | ... | ... | ... | ... |
| 12 | 0 | 12 | 0 | 87.0 | -6.7 | 3.0 |
| 90 | 60 | 60 | 0 | 35.2 | -21.2 | -11.1 |
| 45 | 90 | 90 | 0 | 37.3 | 33.6 | 25.2 |
| 20 | 100 | 100 | 20 | 33.1 | 48.2 | 31.8 |
| 0 | 100 | 20 | 0 | 43.3 | 73.6 | 3.5 |
| 70 | 20 | 10 | 20 | 49.0 | -17.7 | -28.9 |
| 20 | 12 | 12 | 10 | 73.1 | -2.2 | -4.7 |
| 90 | 45 | 0 | 0 | 40.5 | -10.5 | -51.3 |
| 0 | 7 | 0 | 0 | 89.0 | 6.1 | -5.0 |

COLOR PROCESSING APPARATUS, IMAGE FORMING APPARATUS, AND NON-TRANSITORY COMPUTER READABLE RECORDING MEDIUM PERFORMING COLOR CONVERSION, ADJUSTMENT AND MATCHING PROCESS BETWEEN INPUT COLOR DATA AND REPRODUCIBLE COLOR DATA OF IMAGE OUTPUT DEVICE

CROSS-REFERENCE TO RELATED APPLICATIONS

This application is based on and claims priority under 35 USC 119 from Japanese Patent Application No. 2014-030797 filed Feb. 20, 2014.

BACKGROUND

Technical Field

The present invention relates to a color processing apparatus, an image forming apparatus, and a non-transitory computer readable recording medium.

SUMMARY

According to an aspect of the invention, there is provided a color processing apparatus including:

an associated information obtaining section that obtains first associated information in which first color information in a first color space is associated with first output color information that is a target to be output in a second color space when the first color information is input to a color adjustment target unit where color adjustment of an image is performed, and second associated information in which the first color information is associated with second output color information in the second color space of an image output when the first color information is input to the color adjustment target unit;

an output section that outputs second color information in the first color space, obtained by converting the first color information used in the second associated information using a conversion relation where the color adjustment of the color adjustment target unit is performed, to the color adjustment target unit;

an output color information obtaining section that obtains third output color information in the second color space output by the color adjustment target unit when the second color information is input to the color adjustment target unit; and a conversion relation creating section that creates the conversion relation based on the third output color information, fourth output color information in the second color space in which the second output color information is associated with the second output color information, and the second color information.

BRIEF DESCRIPTION OF THE DRAWINGS

Exemplary embodiments of the present invention will be described in detail based on the following figures, wherein:

FIG. 3 is a diagram illustrating an example of a functional configuration of a color processing section;

FIGS. 4A and 4B are diagrams illustrating an example of target information and base data stored in an associated information storing unit;

DETAILED DESCRIPTION

Description of Overall Configuration of Image Forming Apparatus

Figure 1:
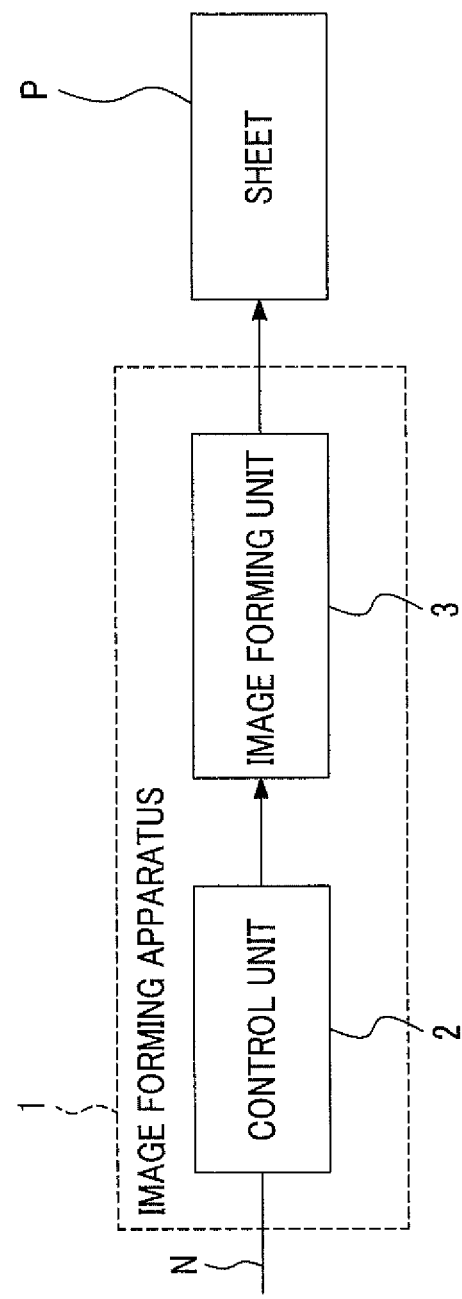
FIG. 1 is a diagram illustrating an example of a functional configuration of an image forming apparatus according to an exemplary embodiment of the invention.

FIG. 1 is a diagram illustrating an example of a functional configuration of an image forming apparatus 1 according to an exemplary embodiment of the invention.

The image forming apparatus 1 includes a control unit 2 that controls respective mechanisms of the image forming apparatus 1, and an image forming unit 3 that is a print mechanism that forms an image on a sheet (recording material or recording medium) P.

The control unit 2 of the image forming apparatus 1 is connected to a network N, and receives printing data (image data) from a personal computer (PC) or the like (not shown) through the network N. After subject to image processing necessary for color adjustment or the like, the printing data is transmitted to the image forming unit 3, which will be described later in more detail. The control unit 2 functions as an example of a color adjusting unit (color processing apparatus) that performs color adjustment of an image formed by the image forming unit 3 and creates a conversion relation used for performing the color adjustment, which will be described later in more detail.

In the present exemplary embodiment, the image forming unit 3 is an example of a color adjustment target unit in which the color adjustment of the image is performed, and forms an image on the sheet P using plural coloring materials. The image forming unit 3 is a printer, for example, and in the present exemplary embodiment, is an electro-photographic printer that uses a toner as a coloring material and transfers the toner attached to a photoconductor onto the sheet P to form an image. Here, the invention is not limited thereto, and the image forming unit 3 may be an inkjet printer that uses ink as a coloring material and ejects the ink onto a recording medium to form an image. The image forming unit 3 performs printing on the sheet P, and then, outputs the sheet P outside the image forming apparatus 1 as a printed matter.

Example of Functional Configuration of Control Unit

Figure 2:
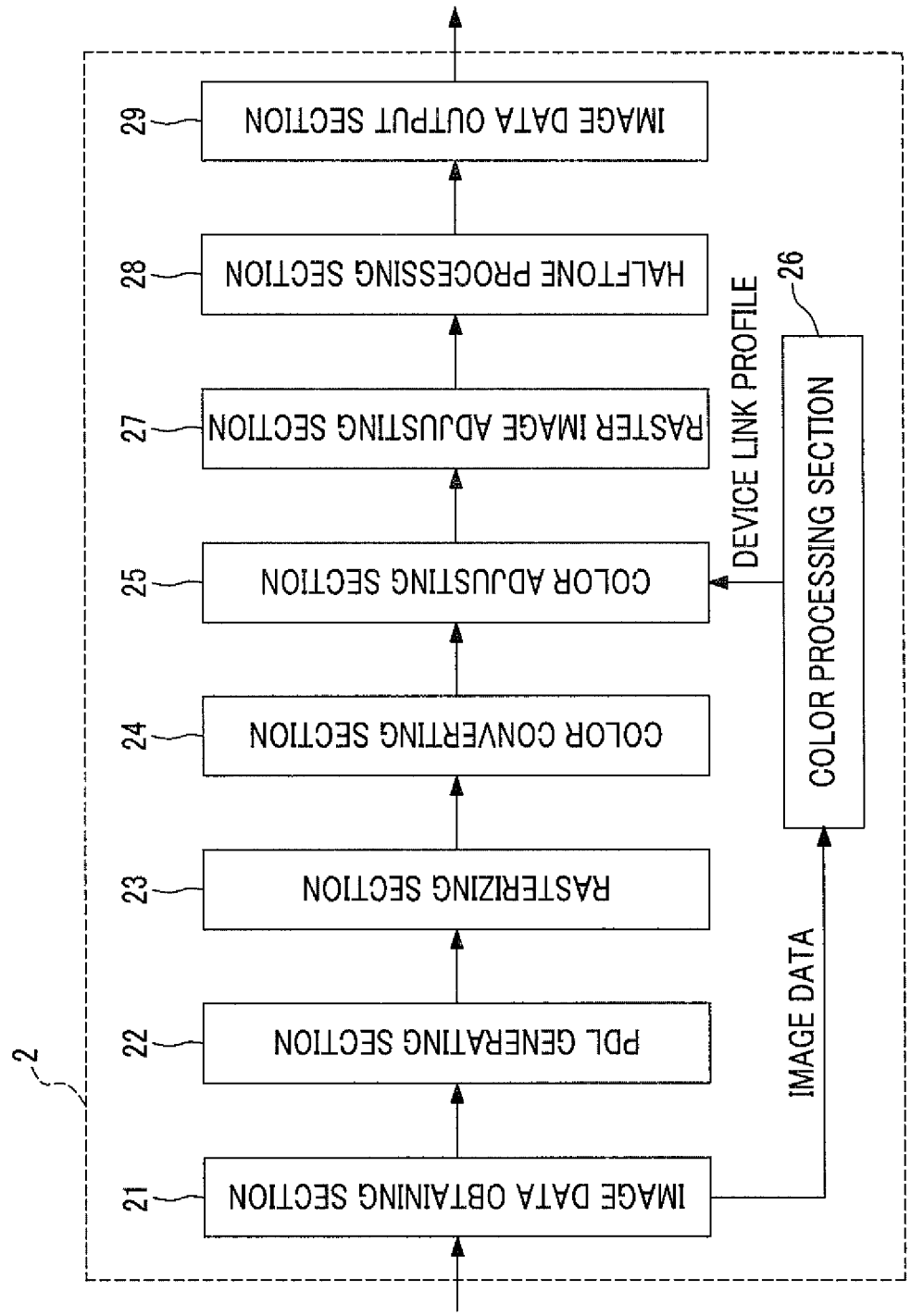
FIG. 2 is a block diagram illustrating a signal processing system in a control unit.

FIG. 2 is a block diagram illustrating a signal processing system in the control unit 2.

The control unit 2 includes an image data obtaining section 21 that obtains printing data created for image output by the image forming unit 3; a page description language (PDL) generating section 22 that receives the printing data and converts the printing data into a PDL; a rasterizing section 23 that creates a raster image from the PDL generated by the PDL generating section 22; a color converting section 24 that converts RGB data into YMCK data; a color adjusting section 25 that performs color adjustment of the YMCK data; a color processing section 26 that creates a profile for the color adjustment in the color adjusting section 25; a raster image adjusting section 27 that adjusts the raster image converted by the color adjusting section 25; a halftone processing section 28 that performs halftone processing; and an image data output section 29 that outputs the color-converted printing data to the image forming unit 3.

In the present exemplary embodiment, first, the image data obtaining section 21 receives printing data from the external PC. The printing data is image data that a user of the PC desires to print using the image forming apparatus 1.

Then, the printing data is transmitted to the PDL generating section 22, and the PDL generating section 22 converts the printing data to code data written in the PDL for output.

The rasterizing section 23 converts the code data written in the PDL output from the PDL generating section 22 into raster data for each pixel to form a raster image. Further, the rasterizing section 23 outputs the converted raster data as video data (RGB data) of RGB (Red, Green, and Blue). Here, the rasterizing section 23 outputs the RGB data for every page.

The color converting section 24 converts the RGB data input from the rasterizing section 23 into device-independent XYZ color values, and then, converts the values into YMCK data that corresponds to reproduction colors (colors of toners that are coloring materials: yellow (Y), magenta (M), cyan (C), and black (K)) of the image forming apparatus 1 for output. The YMCK data includes Y color data, M color data, C color data, and K color data that are divided according to the respective colors.

The color adjusting section 25 performs color adjustment of the image formed by the image forming unit 3. The color adjusting section 25 adjusts the colors of the YMCK data to match with target colors to be originally output by the image forming unit 3 corresponding to the YMCK data, which will be described later in more detail. In this case, the color adjustment is a process of converting $Y_{in}M_{in}C_{in}K_{in}$ data into $Y_{out}M_{out}C_{out}K_{out}$ data (($Y_{in}$, $M_{in}$, $C_{in}$, $K_{in}$)→($Y_{out}$, $M_{out}$, $C_{out}$, $K_{out}$)) In the present exemplary embodiment, the conversion is performed by using a so-called device link profile that directly converts the $Y_{in}M_{in}C_{in}K_{in}$ data into the $Y_{out}M_{out}C_{out}K_{out}$ data in the same YMCK color space as in the $Y_{in}M_{in}C_{in}K_{in}$ data, instead of converting the $Y_{in}M_{in}C_{in}K_{in}$ data into a different color space such as an L*a*b* color space or the like.

In the present exemplary embodiment, the device link profile is an example of the conversion relation, and may be created as a four-dimensional look up table (LUT).

The color processing section 26 creates the device link profile used for the color adjustment in the color adjusting section 25. Further, the color processing section 26 stores the device link profile, and the color adjusting section 25 performs the color adjustment with reference to the device link profile stored in the color processing section 26.

The raster image adjusting section 27 performs γ conversion, definition processing, halftone processing and the like for the $Y_{out}M_{out}C_{out}K_{out}$ data input from the color adjusting section 25, to thus perform various adjustments to obtain excellent image quality in the image forming unit 3.

The halftone processing section 28 performs the halftone processing for the printing data by performing dither mask processing using a dither mask having a predetermined threshold arrangement in a main scanning direction and a sub scanning direction. Thus, the printing data is changed from a multinary representation to a binary representation, for example.

The image data output section 29 outputs the image data that is subject to the image processing such as a color conversion process to the image forming unit 3.

Here, the image forming unit 3 may perform color matching with a different device. For example, after many printed matters are output by a printer that is a different device, when printing is performed by the image forming apparatus 1 for additional printing, the color of the image formed on the sheet P should be the same as that of the printer with respect to the same image data. Further, for example, the color of the formed image may be changed as a variation with time occurs in the image forming unit 3. In this case, since the color of the output image does not match with a target color, it is similarly necessary to perform the color matching.

In such a case, when performing the color matching, it is necessary to create the device link profile used in the color adjusting section 25 again.

Specifically, an adjustment chart where color measurement images (color patches) are written by the image forming unit 3 is output, the color measurement images are measured by a colorimeter or the like, and the device link profile is newly created based on color data obtained by the color measurement.

However, the number of the color measurement images printed as the adjustment chart to this end is normally 1000 to 2000, which causes a problem in that it takes a long time for the process of performing the color measurement and the process of calculating the device link profile from the color data.

Accordingly, it is necessary to reduce the number of the color measurement images, and to create the device link profile by a simple method again.

Further, a method of printing a management chart to create the device link profile again may be considered, in addition to the adjustment chart. The management chart is used for checking whether a color desired by the user is printed or not. Here, the printed color measurement images are important in color management, and for example, include colors such as skin color or gray that is visually conspicuous, gradations of YMCK primary colors that determine color tones of the entire color reproduction area, or the like. Further, the user measures the color measurement images by vision or a colorimeter to check the colors.

The number of color measurement images printed in the management chart is 200, for example, which is generally smaller than that of the color measurement images printed as the adjustment chart. Further, the colors of the color measurement image of the image adjustment chart are originally used to create the device link profile and are thus set to be relatively uniform in the color space, whereas the color measurement images printed in the management chart are generally non-uniform when seen in the color space. Furthermore, since the number of the color measurement images is small, the color measurement images in the management chart are easily influenced by measurement errors or variation. Thus, if the device link profile is created again by the color measurement images printed in the management chart, the accuracy of color conversion may be easily lowered.

Further, in the related art, there is a method for correcting the device link profile. This is a method for changing lattice points (YMCK data) of the device link profile, for example, to correct the device link profile.

However, in this method, a problem easily occurs when a color guarantee of the image formed by the image forming unit 3 is necessary. Here, the color guarantee refers to a process of preventing pure colors (respective monochromes of Y color, M color, and C color) or the process black color from being changed. In other words, if a different color is mixed after the color adjustment is performed for the $Y_{in}M_{in}C_{in}K_{in}$ data of pure colors, turbidity occurs, and thus, it is necessary to create the device link profile to prevent the occurrence of turbidity.

Specifically, when each color data is represented as integer values of 0 to 255 of 8 bits (256 gradations), and for example, when the color conversion of $(Y_{in}, M_{in}, C_{in}, K_{in}) \rightarrow (Y_{out}, M_{out}, C_{out}, K_{out})$ is performed, in order to guarantee the Y color, it is necessary to perform the color conversion while maintaining the colors other than the Y color to 0 as in (20, 0, 0, 0)→(15, 0, 0, 0).

Further, for the process black, it is necessary to perform the conversion while retaining the color data of the K color in order to prevent the change of the color tone. For example, when the color conversion of $(Y_{in}, M_{in}, C_{in}, K_{in}) \rightarrow (Y_{out}, M_{out}, C_{out}, K_{out})$ is performed, the device link profile is created to retain the color data of the K color as in (20, 20, 20, 100)→(15, 15, 15, 100).

However, here, in the method for changing the lattice points (YMCK data) of the device link profile in the related art, when the color guarantee is particularly performed, the accuracy of the color conversion of the device link profile is easily lowered.

Thus, in the present exemplary embodiment, the color processing section 26 has the following configuration to prevent the above-mentioned problems.

Example of Functional Configuration of Color Processing Section

FIG. 3 is a diagram illustrating an example of a functional configuration of the color processing section 26.

As shown in FIG. 3, the color processing section 26 of the present exemplary embodiment includes an image selecting section 261, an image data storing section 262, an image output section 263, a color data obtaining section 264, an associated information obtaining section 265, an associated information storing section 266, a predicting section 267, a conversion relation creating section 268, and a conversion relation storing section 269.

The image selecting section 261 selects the color measurement images for creating the device link profile again. The color measurement images are mixed-color images obtained by setting various Cin in the range of 0% to 100% for the respective colors of YMCK, which are the color measurement images of the above-describe management chart, for example. In this case, the number of the included color measurement images is 200, for example.

The image data storing section 262 stores image data of the color measurement images. In reality, when the color data of the respective colors of YMCK is set to gradation values represented as integer numbers of 0 to 255, the image data of the color measurement images is stored as the gradation values.

The image output section 263 outputs the image data of the color measurement images selected by the image selecting section 261 to the image forming unit 3.

The image forming unit 3 receives the image data of the color measurement images, and prints the color measurement images onto the sheet P. The printed color measurement images are read by a colorimeter or the like. Further, the colorimeter or the like transmits the color data obtained by reading the color measurement images to the color processing section 26 of the control unit 2. Here, the color data output by the colorimeter corresponds to L*a*b* data that includes respective pieces of color data of L* data, a* data, and b* data in the L*a*b* color space, for example.

The color data obtaining section 264 is an example of an output color information obtaining section, and obtains the color data of the color measurement images transmitted by the colorimeter as color information.

The associated information obtaining section 265 obtains first associated information and second associated information. Here, the first associated information refers to target information to be described in detail later, for example, which is information in which first color information in a first color space is associated with first output color information that is a target to be output in a second color space when the first color information is input to the image forming unit 3. In the case of the present exemplary embodiment, the "first color information in the first color space" refers to YMCK data in the YMCK color space. Further, the "first output color information that is the target to be output in the second color space when the first color information is input to the image forming unit 3" refers to L*a*b* data that is a target to be output in the L*a*b* color space when the YMCK data is input to the image forming unit 3. In other words, the first associated information is information in which target colors output by the image forming unit 3 are associated with the YMCK data of predetermined values, which forms a correspondence relation of (Y, M, C, K)–(L*, a*, b*). As the correspondence relation, in the present exemplary embodiment, for example, 1584 types are prepared, which form the first associated information.

Further, the second associated information refers to base data to be described in detail later, for example, which is information in which the first color information is associated with second output color information, in the second color space, of the images that are previously output when the first color information is input to the image forming unit 3. In the case of the present exemplary embodiment, the "first color information" refers to the above-mentioned YMCK data in the YMCK color space. Further, the "second output color information, in the second color space, of the images output when the first information is input to the image forming unit 3" refers to L*a*b* data in the L*a*b* color space obtained when colors of images output onto the sheet P as the YMCK data is input to the image forming unit 3 are measured. In other words, the second associated information is information in which color data of the images that are actually output by the image forming unit 3 are associated with the YMCK data of predetermined values, which forms a correspondence relation of (Y, M, C, K)–(L*, a*, b*). As the correspondence relation, in the present exemplary embodiment, for example, 1584 types are prepared similarly to the first associated information, which form the second associated information.

The associated information storing section 266 stores the target information that is the first associated information and the base data that is the second associated information.

FIGS. 4A and 4B are diagrams illustrating an example of the target information and the base data stored in the associated information storing section 266.

As shown in FIGS. 4A and 4B, both of the target information and the base data are information in which the YMCK data is associated with the L*a*b* data. In FIGS. 4A and 4B, although a middle part thereof is omitted, 1584 types of correspondence relations are present as described above. As shown in FIGS. 4A and 4B, the YMCK data of the target information and the YMCK data of the base data are common, and employ the same values. On the other hand, the L*a*b* data of the target information and the L*a*b* data of the base data are normally different from each other. This represents that the L*a*b* data that is the target and the L*a*b* data that is actually output by the image forming unit 3 are different from each other.

The predicting section 267 predicts the base data that is newly applied, which will be described in detail later. The prediction is performed based on the color measurement result of the color measurement images in the management chart.

The conversion relation creating section 268 creates the device link profile again based on the newly applied base data that is predicted by the predicting section 267.

Further, in the present exemplary embodiment, the device link profile is represented as a correspondence relation ((Y, M, C, K)–(Y', M', C', K')) in which the YMCK data is converted into Y', M', C', K' data in the YMCK color space.

The conversion relation storing section 269 stores the device link profile created by the conversion relation creating section 268. The stored device link profile is referenced by the color adjusting section 25 (see FIG. 2), so that the color conversion of $(Y_{in}, M_{in}, C_{in}, K_{in}) \rightarrow (Y_{out}, M_{out}, C_{out}, K_{out})$ is performed.

Description about Operation of Color Processing Section

Next, the operation of the color processing section 26 will be described.

Figure 5:
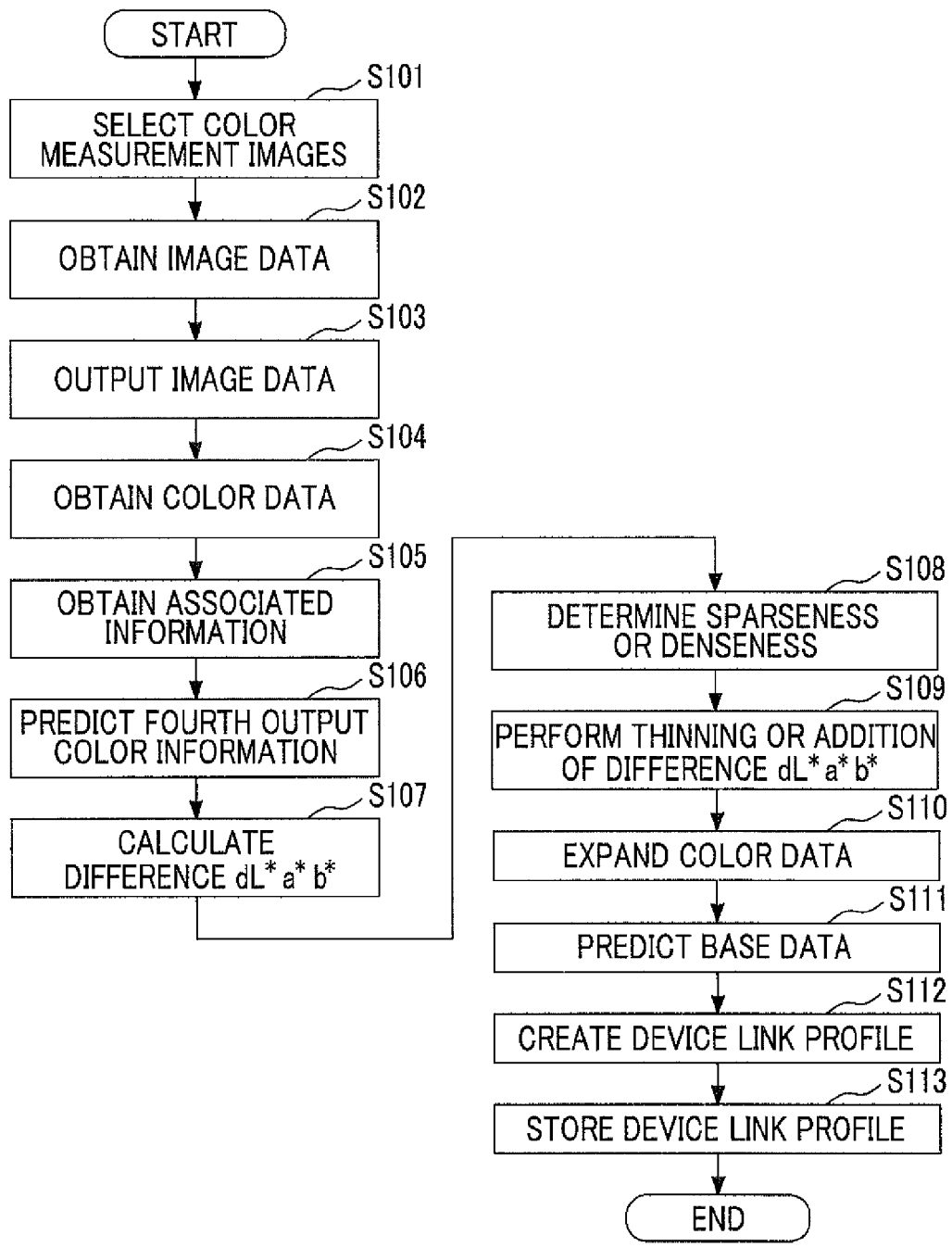
FIG. 5 is a flowchart illustrating an operation of the color processing section.
Figure 6:
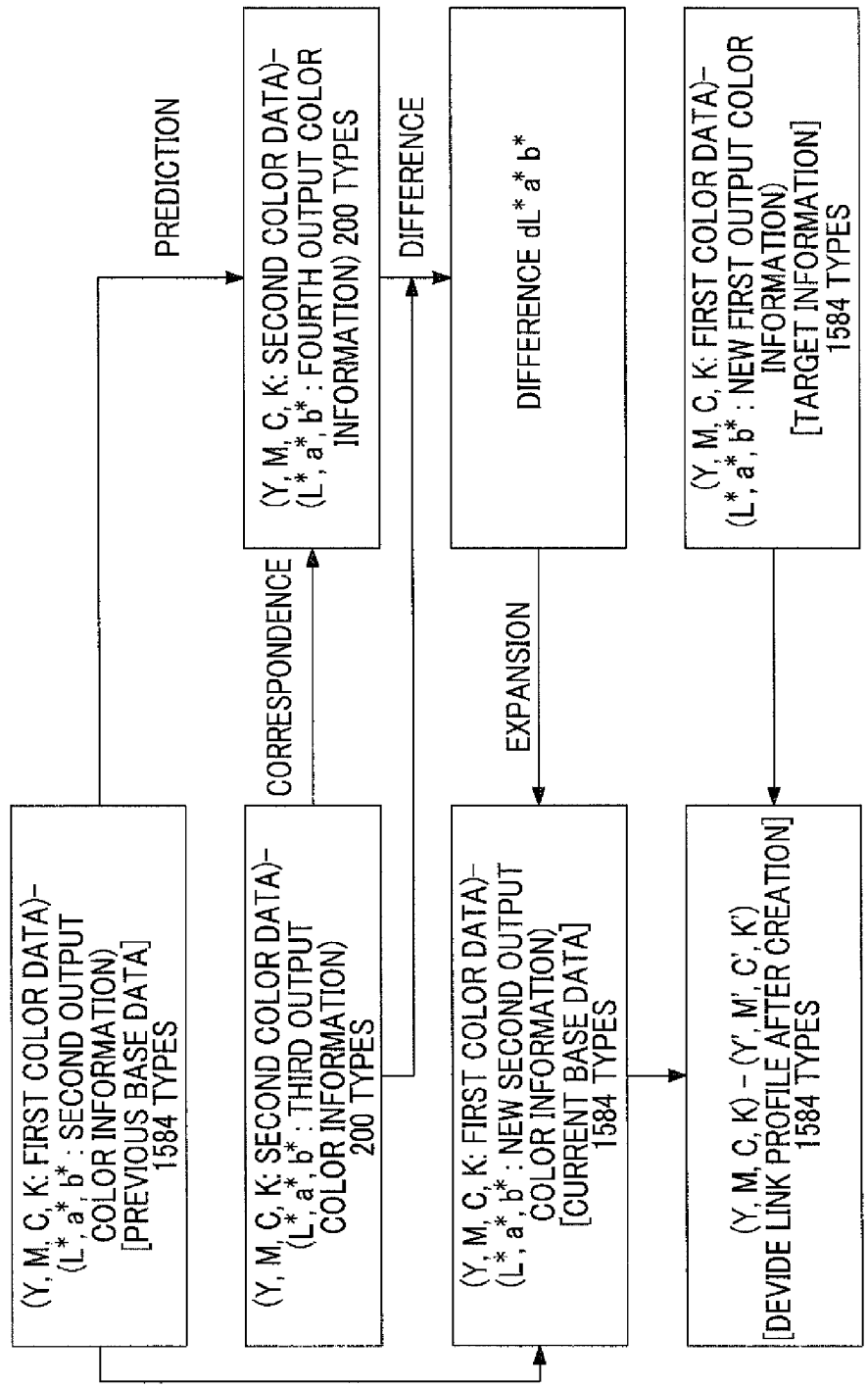
FIG. 6 is a diagram illustrating association of color data.

FIG. 5 is a flowchart illustrating the operation of the color processing section 26. Further, FIG. 6 is a diagram illustrating association of color data used at this time.

Hereinafter, the operation of the color processing section 26 will be described with reference to FIGS. 3, 5, and 6.

First, the image selecting section 261 performs selection of the color measurement images in the management chart (step 101). The number of the selected color measurement images is 200, for example.

Further, the image selecting section 261 obtains image data of the color measurement images from the image data storing section 262 (step 102).

Next, the image output section 263 outputs image data of the obtained color measurement images to the image forming unit 3 (step 103). Here, the output image data refers to image data of the color measurement images in the management chart.

Here, the image data output section 29 (see FIG. 2) outputs the color-converted YMCK data. In the present exemplary embodiment, the color-converted YMCK data is referred to as second color information. Accordingly, the image data output section 29 may be used as an output section that outputs the second color information (YMCK data obtained by color-converting the image data of the color measurement images in the management chart) in the first color space, obtained by conversion based on the conversion relation, to the image forming unit 3.

The output image data is printed onto the sheet P as the color measurement images in the management chart by the image forming unit 3. Then, the printed color measurement images are read by a colorimeter, and consequently, the color data of the obtained color measurement images is obtained by the color data obtaining section 264 (step 104). Here, the color data obtained by the color data obtaining section 264 is used as third output color information, herein. This color data is the L*a*b* data as described above, which is L*a*b* data of images output when the YMCK data that is the image data of the color measurement images in the management chart is input to the current image forming unit 3.

Accordingly, the color data obtaining section 264 may be used as an output color information obtaining section that obtains the third output color information (L*a*b* data in the L*a*b* color space) in the second color space, output by the image forming unit 3 when the second color information (YMCK data obtained by color-converting the image data of the color measurement images in the management chart) input to the image forming unit 3.

Then, the associated information obtaining section 265 obtains the target information and the base data as the associated information with reference to the associated information storing section 266 (step 105).

Then, the predicting section 267 associates the L*a*b* data used in the base data with the YMCK data (second color information) obtained by color-converting the image data of the color measurement images in the management chart, based on the base data (shown as "previous base data" in FIG. 6). In the present exemplary embodiment, this L*a*b* data is referred to as fourth output color information. In other words, the predicting section 267 predicts the L*a*b* data corresponding to the YMCK data that is the image data of the color measurement images in the management chart as the fourth output color information based on the correspondence relation of the YMCK data and the L*a*b* data of the base data (step 106).

Accordingly, the predicting section 267 predicts the fourth output color information (L*a*b* data in the L*a*b* color space) in the second color space, obtained by associating the second output color information (L*a*b* data of the base data) with the second color information (YMCK data obtained by color-converting the image data of the color measurement images in the management chart).

The fourth output color information becomes L*a*b* data of the images output when the YMCK data that is the image data of the color measurement images in the management chart is input to the (previous) image forming unit 3 when the device link profile is created.

Further, the predicting section 267 creates the current second associated information (base data) that is newly applied from the third output color information (L*a*b* data of the images output when the YMCK data that is the image data of the color measurement images in the management chart is input to the current image forming unit 3), the fourth output color information (L*a*b* data of the images output when the YMCK data that is the image data of the color measurement images in the management chart is input to the (previous) image forming unit 3 when the device link profile is created), and the second color information (YMCK data obtained by color-converting the image data of the color measurement images in the management chart).

In reality, first, dL*a*b*(dL*, da*, db*) is calculated as a difference between the third output color information and the fourth output color information (step 107).

Then, in the YMCK color space, it is determined whether places where the YMCK data (second color information) obtained by color-converting the image data of the color measurement images in the management chart is present is sparse or dense (step 108).

Further, as a result of the sparseness or denseness determination, in a place where the third output color information or the fourth output color information is dense, a process of thinning the difference dL*a*b is performed, and in a place where the information is sparse, for example, dL*a*b*=0 is added so that an expansion result is not diverged in an expansion process to be performed later (step 109). Namely, the entirely of the third output color information or the fourth output color information is not necessarily used, and is preferably added as necessary.

In addition, for example, 200 pieces of dL*a*b* are expanded to 1584 pieces similar to the L*a*b* data of the base data (step 110). Specifically, for example, a process of connecting the respective differences dL*a*b* by an interpolation operation using the YMCK data (second color information) obtained by color-converting the image data of the color measurement images in the management chart is performed, to thereby select 1584 points from the connection line.

Figure 7:
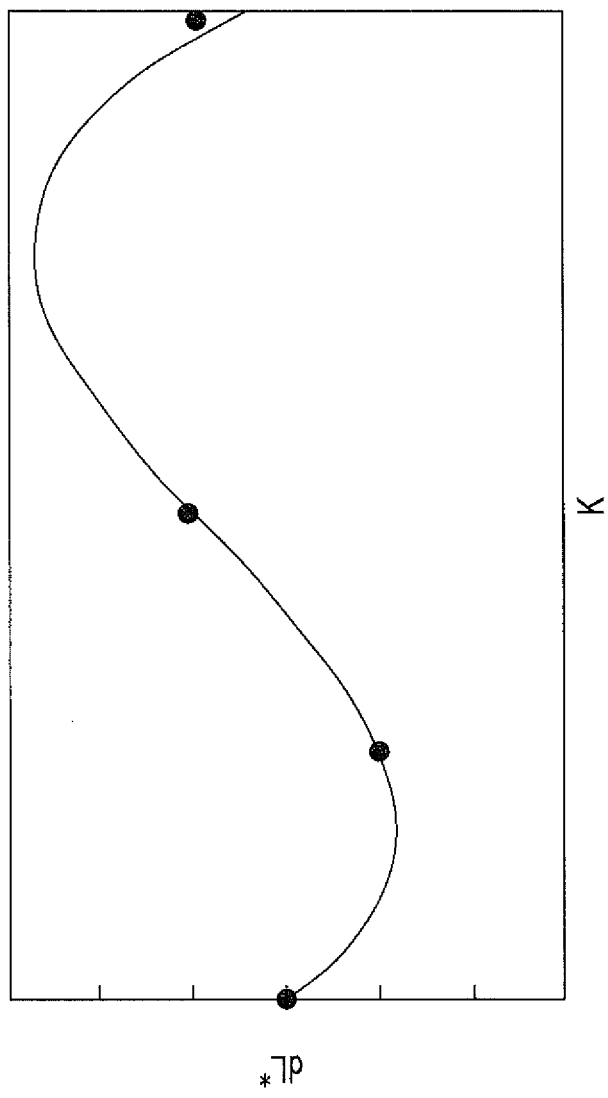
FIG. 7 is a conceptual diagram illustrating an expansion process performed in a predicting unit.

FIG. 7 is a conceptual diagram illustrating the expansion process performed in the predicting section 267.

In FIG. 7, the transverse axis represents K in the YMCK data (second color information) obtained by color-converting the image data of the color measurement images in the management chart, and the longitudinal axis represents the difference dL* in the difference dL*a*b* between the second output color information and the third output color information. Further, a black circle represents a difference before expansion, and a solid line is a line that connects difference values before expansion by the interpolation operation. Difference values after expansion may be selected from the solid line.

Further, the predicting section 267 predicts the base data (second associated information) that is newly applied using the dL*a*b* data after expansion (step 111). Namely, the predicting section 267 adds the dL*a*b* data after expansion to the places of (L*, a*, b*) of the correspondence relation of (Y, M, C, K)–(L*, a*, b*) that forms the previous base data. Here, this data is referred to as predicted and newly applied base data. In this case, the YMCK data of the base data is maintained as it is.

As described above, the predicting section 267 creates the base data (second associated information) that is newly applied based on the difference dL*a*b* data between the third output color information and the fourth output color information.

Further, the conversion relation creating section 268 compares the new base data (second associated information) with the target information (first associated information), and creates the device link profile again based on the comparison (step 112). Specifically, the conversion relation creating section 268 compares the L*a*b* data of the base data with the L*a*b* data of the target information, and creates a correspondence relation of the YMCK data in which the L*a*b* data matches with each other. As described above, it is possible to create the device link profile based on the third output color information, the fourth output color information, and the second color information.

Further, here, when the above-described color guarantee is performed, in order to perform the color guarantee, the device link profile is created so as not to change at least part of the YMCK data (first color information) of the target information. In the above described example, for the color guarantee of the Y color, the device link profile is created so that the M color data, the C color data, and the K color data other than the Y color data are retained as 0 without change. Further, for the color guarantee for the process black, the device link profile is created so that the K color data is retained as it is without change.

As described above, it is possible to create the device link profile that performs the color adjustment of the image forming unit 3 in the YMCK color space (in the first color space).

The device link profile is stored in the conversion relation storing section 269 (step 113).

According to the above-described color processing section 26, the newly applied base data is predicted without changing the lattice points of the device link profile as in the related art. As a result, even when an option process such as color guarantee is applied, the accuracy of the color conversion of the device link profile is not lowered. Further, when the color data of the color measurement images in the management chart is expanded and the device link profile is created again using the expanded color data, since the difference values of the color data are expanded, even though the number of the color measurement images is small, the influence due to measurement errors or variation is small. Consequently, the accuracy of the color conversion of the device link profile is easily enhanced. Thus, it is not necessary to separately provide the adjustment chart and the management chart, and one management chart may be used. Since the number of the color measurement images is small, it is simple to perform the creation of the device link profile of the color adjustment target unit.

In the above-described example, the fourth output color information is predicted (step 106 in FIG. 6), but the invention is not limited thereto. For example, the management chart printed approximately at the same time when the previous device link profile is created may be stored, and a color measurement result thereof may be used as the fourth output color information.

Further, in the above-described example, the third output color information is the L*a*b* data of the images output when the YMCK data that is the image data of the color measurement images in the management chart is input to the current image forming unit 3, but the invention is not limited thereto. For example, for the third output color information, a previous history for a predetermined period (for example, one week) may be stored, and an average value thereof may be employed. Thus, when the color measurement images in the management chart are color-measured by a colorimeter or the like, it is possible to suppress variation of the measurement, and to easily enhance the accuracy of the color conversion of the device link profile.

In addition, in the above-described embodiment, the image output section 263 color-converts the YMCK data that is the image data of the color measurement images in the management chart by the color adjusting section 25 (see FIG. 2) using the device link profile, but it is not necessary to color-convert the entirety of the YMCK data that is the image data of the color measurement images in the management chart. For example, pure colors of the respective colors of YMCK may be included without color conversion, and consequently, images printed on the sheet P without color conversion may be used as color measurement images for gradation correction of the respective colors of YMCK. As described above, by necessarily performing the color measurement without color conversion of patches having a high degree of influence, it is possible to easily enhance the accuracy of the color conversion of the device link profile.

Furthermore, in the above-described embodiment, the color adjustment target unit is the image forming unit 3, but the invention is not limited thereto. For example, the color adjustment target unit may be a display such as a liquid crystal display. In this case, the first color space corresponds to the RGB color space, and the first color information and the second color information correspond to the RGB data. Further, the second color space corresponds to the L*a*b* color space, but the invention is not limited thereto. However, it is preferable that the second color space be a color space that does not depend on the device.

Figure 8:
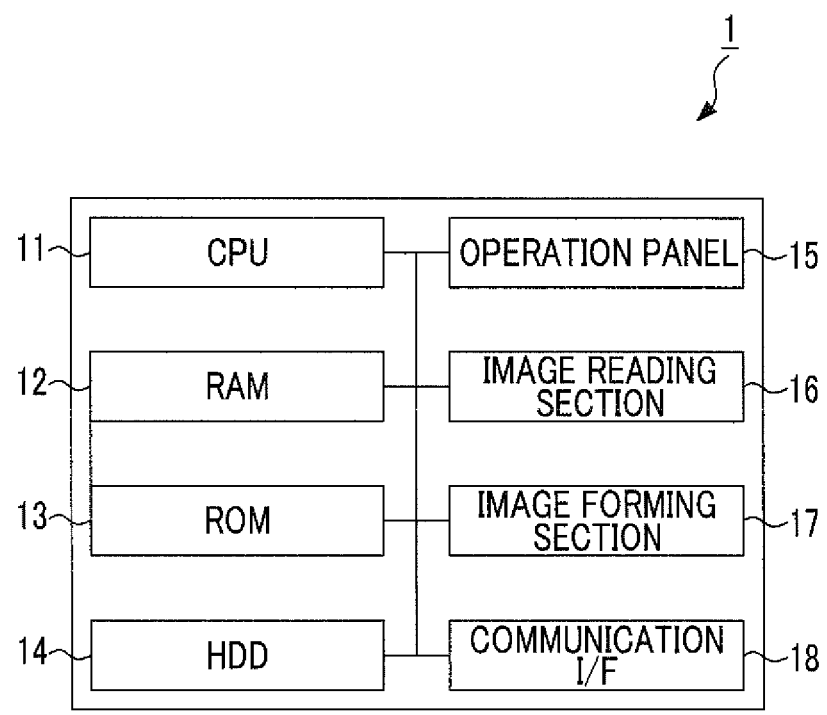
FIG. 8 is a diagram illustrating an example of a hardware configuration of the image forming apparatus.

FIG. 8 is a diagram illustrating an example of a hardware configuration of the image forming apparatus 1.

As shown in FIG. 8, the image forming apparatus 1 includes a CPU 11, a random access memory (RAM) 12, a read only memory (ROM) 13, an HDD 14, an operation panel 15, an image reading section 16, an image forming section 17, and a communication interface (hereinafter, referred to as a "communication I/F") 18.

The CPU 11 loads various programs stored in the ROM 13 or the like onto the RAM 12 for execution, to thereby realize respective functions of the image forming apparatus 1.

The RAM 12 is a memory that is used as a work memory or the like of the CPU 11.

The ROM 13 is a memory that stores the various programs executed by the CPU 11, or the like.

The HDD 14 is, for example, a magnetic disk drive that stores image data read by the image reading section 16, image data used for image formation in the image forming section 17, or the like.

The operation panel 15 is, for example, a touch panel that displays a variety of information and receives operation inputs from a user.

The image reading section 16 reads an image recorded on a recording medium such as a paper. Here, the image reading section 16 is, for example, a scanner, which may employ a charge coupled device (CCD) type that reduces reflected light from light irradiated onto an original document from a light source by a lens and receives the reflected light by a CCD or a contact image sensor (CIS) type that receives reflected light from light sequentially irradiated onto an original document from an LED light source by a CIS.

The image forming section 17 forms an image onto the sheet P. The image forming section 17 is the same as the image forming unit 3 shown in FIG. 1.

The communication I/F 18 performs transmission and reception of a variety of information with respect to a different apparatus through the network N.

Description about Program

Here, the processes performed by the control unit 2 in the present exemplary embodiment described above are realized by cooperation of software and hardware resources. For example, the CPU 11 in the image forming apparatus 1 loads a program that realizes respective functions of the control unit 2 onto the RAM 12 from the ROM 13 for execution to perform the processes.

Accordingly, the processes performed by the control unit 2 may be facilitated as a program that causes a computer to execute the function of obtaining the first associated information (target information) in which the first color information in the first color space (YMCK data in the YMCK color space) is associated with the first output color information that is the target to be output in the second color space (L*a*b* data in the L*a*b* color space) when the first color information is input to the color adjustment target unit (image forming unit 3) where the color adjustment of the image is performed, and the second associated information (base data) in which the first color information is associated with the second output color information in the second color space (L*a*b* data in the L*a*b* color space) of the image output when the first color information is input to the color adjustment target unit; the function of outputting the second color information in the first color space (YMCK data in the YMCK color space), obtained by converting the first color information used in the second associated information using the conversion relation (device link profile) where the color adjustment of the color adjustment target unit is performed, to the color adjustment target unit; the function of obtaining the third output color information (L*a*b* data of the images output when the YMCK data that is the image data of the color measurement images in the management chart is input to the current image forming unit 3) in the second color space output by the color adjustment target unit when the second color information is input to the color adjustment target unit; and the function of creating the conversion relation based on the third output color information, the fourth output color information (L*a*b* data of the images output when the YMCK data that is the image data of the color measurement images in the management chart is input to the image forming unit 3 when the device link profile is created) in the second color space in which the second output color information is associated with the second color information, and the second color information.

The program that realizes the present exemplary embodiment may be provided through the communication unit, or may be provided in a state of being stored on a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
    an associated information obtaining section that obtains first associated information in which color information in a device-dependent color space is associated with first output color information that is a target to be output in a device-independnet color space when the color information is input to a color adjustment target unit where color adjustment of an image is performed, and second associated information in which color information in the device-dependent color space is associated with second output color information in the device-independent color space of an image output when the color information in the device-dependent color space is input to the color adjustment target unit;
    an output section that outputs second color information in the first device-dependent color space, obtained by converting the color information used in the second associated information using a conversion relation where the color adjustment of the color adjustment target unit is performed, to the color adjustment target unit;
    an output color information obtaining section that obtains third output color information in the device-independent color space output by the color adjustment target unit when the second color information is input to the color adjustment target unit; and
    a conversion relation creating section that creates the conversion relation based on the third output color information, fourth output color information in the device-independent color space in which the second output color information is associated with the second output color information, and the second color information,
    wherein in the device-dependent color space, it is determined whether the second color information obtained is sparse or dense and, as a result of the determination, in) a place where the third output color information or the fourth output color information is dense, thinning a difference is performed, and in a place where the third output color information or the fourth output color information is sparse, an amount is added so that an expansion result is not diverged in an expansion process.

2. The apparatus according to claim 1, wherein
    the conversion relation creating section creates the conversion relation without changing at least part of the first color information for a color guarantee.

3. The apparatus according to claim 1, further comprising:
    a predicting section that predicts the fourth output color information from the second output color information based on the second associated information.

4. The apparatus according to claim 2, further comprising:
a predicting section that predicts the fourth output color information from the second output color information based on the second associated information.

5. The apparatus according to claim 3, wherein the predicting section creates the second associated information that is newly applied from the third output color information, the fourth output color information, and the second color information.

6. The apparatus according to claim 4, wherein the predicting section creates the second associated information that is newly applied from the third output color information, the fourth output color information, and the second color information.

7. The apparatus according to claim 3, wherein the predicting section creates the second associated information that is newly applied based on a difference between the third output color information and the fourth output color information.

8. The apparatus according to claim 4, wherein the predicting section creates the second associated information that is newly applied based on a difference between the third output color information and the fourth output color information.

9. The apparatus according to claim 5, wherein the predicting section creates the second associated information that is newly applied based on a difference between the third output color information and the fourth output color information.

10. The apparatus according to claim 6, wherein the predicting section creates the second associated information that is newly applied based on a difference between the third output color information and the fourth output color information.

11. The color processing apparatus according to claim 1, wherein
the first color space corresponds to a YMCK color space, and the second color space corresponds to an L*a*b* color space.

12. An image forming apparatus comprising:
an image forming unit that forms an image on a recording material using a plurality of coloring materials; and
a color adjusting section that performs color adjustment of the image formed by the image forming unit and creates a conversion relation used for performing the color adjustment, wherein
the color adjusting section includes:
an associated information obtaining section that obtains first associated information in which color information in a device-dependent color space is associated with first output color information that is a target to be output in a device-independent color space when the color information is input to the image forming unit where color adjustment of an image is performed, and second associated information in which color information in the device-dependent color space is associated with second output color information in the device-independent color space of an image output when the color information in the device-dependent color space is input to the image forming unit;
an output section that outputs second color information in the device-dependent color space, obtained by converting the color information used in the second associated information using the conversion relation, to the image forming unit;
an output color information obtaining section that obtains third output color information in the device-independent color space output by the image forming unit when the second color information is input to the image forming unit; and
a conversion relation creating section that creates the conversion relation based on the third output color information, fourth output color information in the device-independent color space in which the second output color information is associated with the second color information, and the second color information,
wherein in the device-dependent color space, it is determined whether the second color information obtained is sparse or dense, and, as a result of the determination in a place where the third output color information or the fourth output color information is dense, thinning a difference is performed, and in a place where the third output color information or the fourth output color information is sparse, an amount is added so that an expansion result is not diverged in an expansion process.

13. The image forming apparatus according to claim 12, wherein
the first color space corresponds to a YMCK color space, and the second color space corresponds to an L*a*b* color space.

14. A non-transitory computer readable recording medium that stores a program that causes a computer to execute functions comprising:
a function of obtaining first associated information in which color information in a device-dependent color space is associated with first output color information that is a target to be output in a device-independent color space when the color information is input to a color adjustment target unit where color adjustment of an image is performed, and second associated information in which color information in the device-dependent color space is associated with second output color information in the device-independent color space of an image output when the color information in the device-dependent color space is input to the color adjustment target unit;
a function of outputting second color information in the device-dependent color space, obtained by converting the color information used in the second associated information using a conversion relation where the color adjustment of the color adjustment target unit is performed, to the color adjustment target unit;
a function of obtaining third output color information in the device-independent color space output by the color adjustment target unit when the second color information is input to the color adjustment target unit; and
a function of creating the conversion relation based on the third output color information, fourth output color information in the device-independent color space in which the second output color information is associated with the second color information, and the second color information,
wherein in the device-dependent color space, it is determined whether the second color information obtained is sparse or dense, and, as a result of the determination, in a place where the third output color information or the fourth output color information is dense, thinning a difference is performed, and in a place where the third output color information or the fourth output color information is sparse, an amount is added so that an expansion result is not diverged in an expansion process.

15. The non-transitory computer readable recording medium according to claim 14, wherein the first color space corresponds to a YMCK color space, and the second color space corresponds to an L*a*b* color space.

* * * * *